June 22, 1954
N. L. BREWER
2,681,631
ANCHOR
Filed Sept. 9, 1952
3 Sheets-Sheet 2
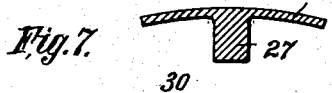
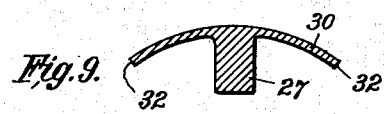
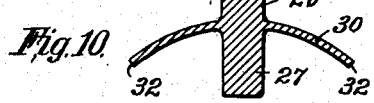
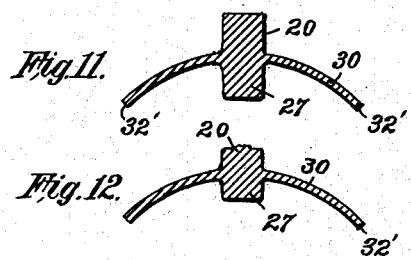
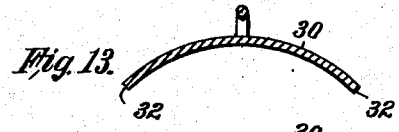
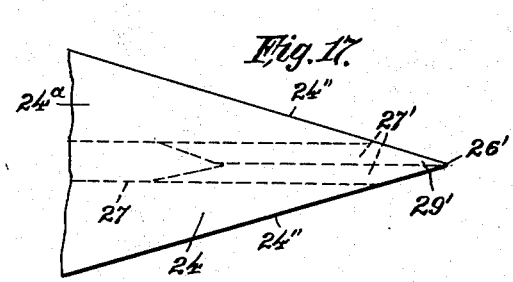
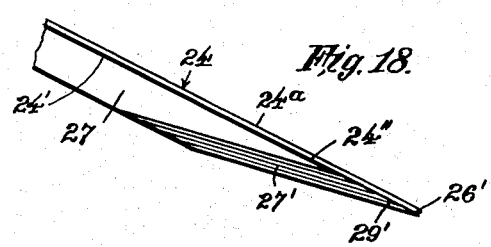
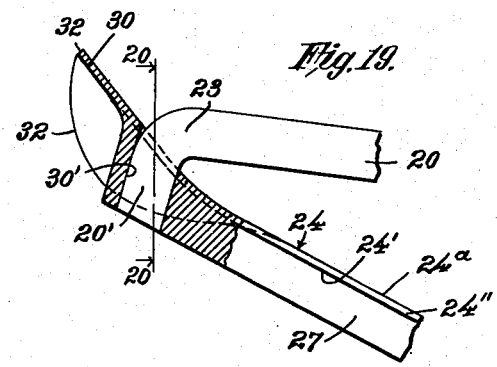
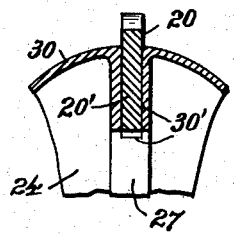
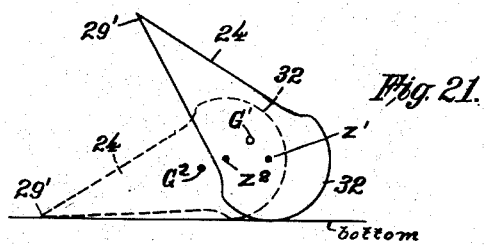
INVENTOR
Nicholas L. Brewer June 22, 1954
N. L. BREWER
2,681,631
ANCHOR
Filed Sept. 9, 1952
3 Sheets-Sheet 3
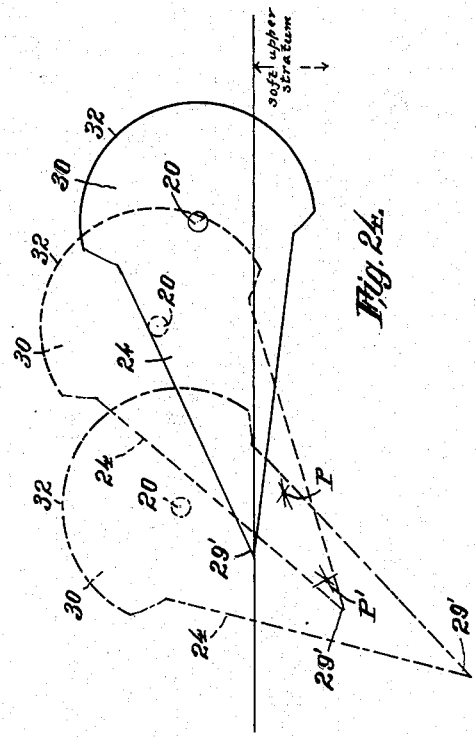
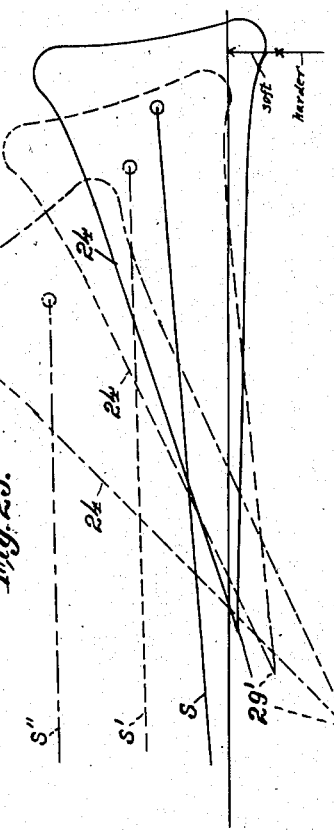
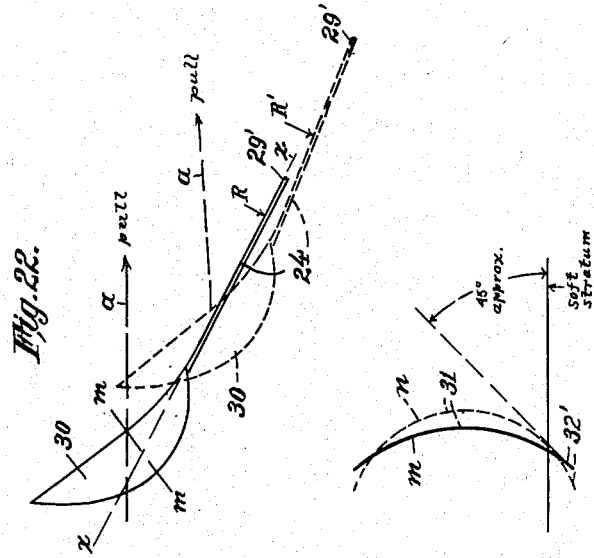
INVENTOR Patented June 22, 1954

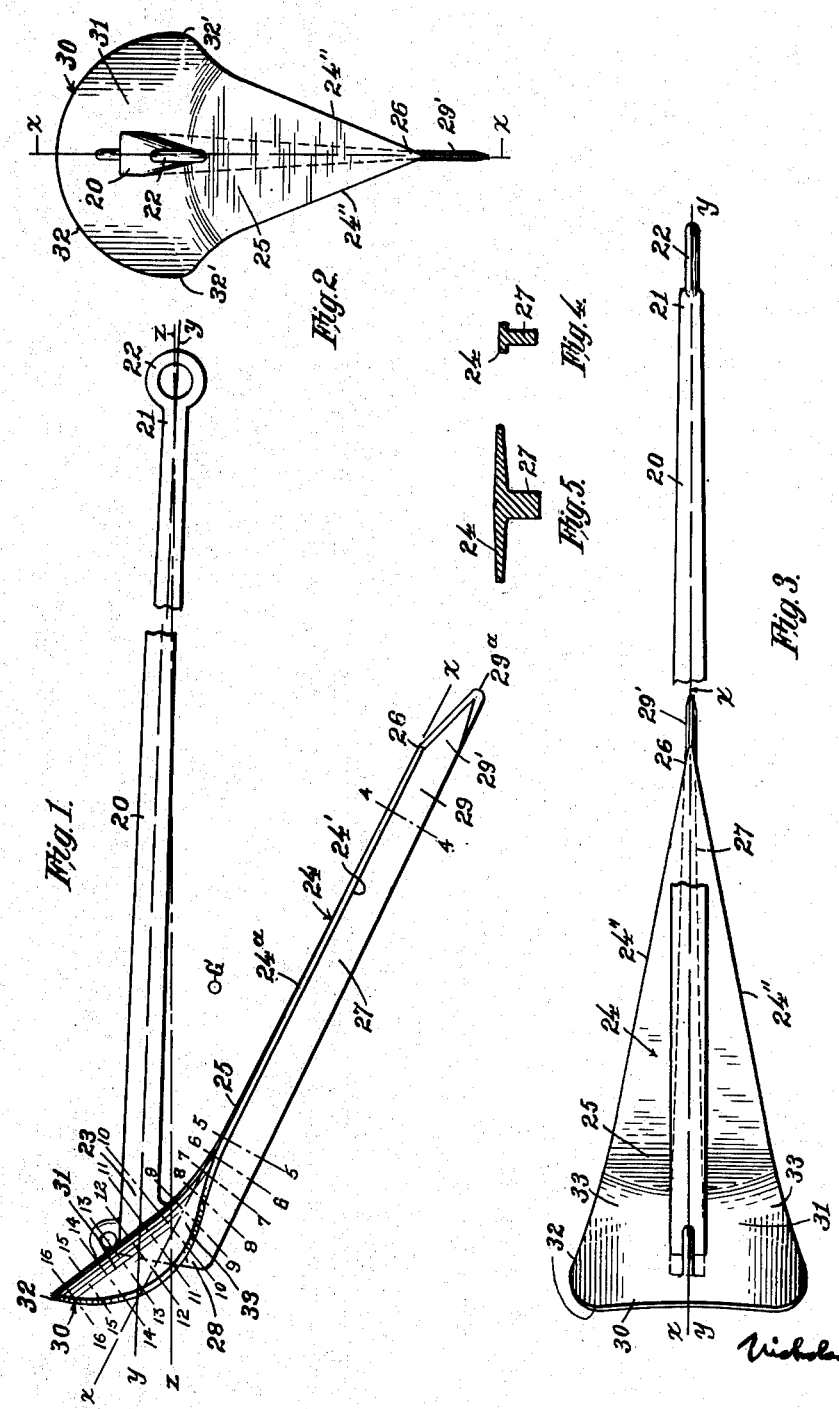

2,681,631

UNITED STATES PATENT OFFICE 2,681,631

ANCHOR

Nicholas L. Brewer, Tarpon Springs, Fla.

Application September 9, 1952, Serial No. 308,598

7 Claims. (Cl. 114—207)

This application is a continuation-in-part of my pending application for patent on Anchors, Ser. No. 117,433, filed September 23, 1949, and now abandoned.

The invention relates to anchors such as are used for mooring ships, boats and other types of marine craft, and particularly to an improved anchor of such construction as can not become fouled by the anchor cable. Fouling of an anchor by the cable occurs when changes in wind and/or tide cause a vessel to swing about its moored position. Any upwardly projecting part of the anchor can then be caught by a turn of the cable. The cable will then pull upon the anchor in such a way that the anchor no longer retains its ability to hold the vessel against the forces of wind and water.

Anchors heretofore and currently employed having a pair of oppositely disposed flukes at one end of a shank and a stock at right angles to the plane of the flukes at any point of the shank are especially liable to fouling by the cable since one fluke stands up away from the bottom and provides an almost unavoidable projection for the cable to wind around.

To avoid this, stockless anchors have been devised having a pair of parallel flukes in the same plane adapted to swing as a unit about a suitable joint at one end of a shank. The major failing of this class of anchors is that they are not dependable when the bottom is uneven in resistance to penetration at locations only short distances apart, which is not an unusual condition. Under this condition, one fluke may dig in whereas the other will not, thus causing the anchor to rotate and withdraw the fluke which has penetrated.

In order to combine the virtues of the stock and stockless anchors and avoid their faults, stocks have been added to the stockless type, usually at the fluke-connected end of the shank and in the plane of the flukes or a plane parallel thereto. This cures the tendency of the stockless type to rotate and eliminates the upstanding flukes of the stock type. However, changes in wind and/or tide frequently unseat these compromise anchors in such a way that complete re-seating fails to occur and the anchor is left in a cocked-up position on and partly in a mound of the bottom pulled up by the unseating. The stock or flukes, sometimes both, then may project up to be readily fouled by the cable.

Single fluke anchors have been designed in attempts to overcome these objectionable features; and such anchors have been provided with an element designed to cause the anchor to roll so as to bring the bill into engagement with the bottom. However, while such devices may be more or less successful for rolling the anchor on a hard smooth bottom, they are useless when the bottom is soft or sticky. Under such conditions they cannot function as designed.

The object of the present invention is to provide an improved anchor which will be free from the above stated objectionable features, and will operate successfully and quickly irrespective of the physical condition of the bottom.

A further object of this invention is to provide a single fluke anchor embodying means for causing the anchor to rotate on a longitudinal axis, whether the bottom is hard or soft, in order to direct the bill and fluke into operative position.

A further and particular object of the invention is to provide in an anchor of the type stated, means for sluing the fluke end of the anchor laterally in the direction of the axis of the fluke, and at the same time, when the bottom is soft, to upwardly cam the inner end of the fluke remote from the bill, together with the adjacent end of the shank, so as to permit the anchor to roll and insure a proper downward angle to the bill and fluke for prompt and rapid penetration of the bottom when pull is exerted by the cable.

Further objects of the invention are to provide an anchor characterized as above stated which shall be of unitary construction, that is, with no relatively moveable parts, whereby it may be readily and safely handled and stowed.

Other objects will appear hereinafter.

With the above objects in view, the anchor embodying the present invention comprises a shank provided at one end with means for attaching a cable, a fluke extending angularly outward and forwardly from the opposite or rear end of the shank, a bill at the outer end of the fluke, and a rudder near the junction of the fluke and shank for causing the anchor to roll on the bottom until the bill engages said bottom, and for sluing the fluke end of the shank laterally and forwardly in line with the fluke, when pull is exerted by the cable.

The invention further consists in an anchor as above stated in which the rudder is of such construction as to cam the fluke end of the anchor upwardly when engaging a soft bottom, whereby the anchor shall roll to properly position the bill and fluke irrespective of the soft upper stratum of the bottom.

The invention further consists in various details of construction and arrangements of parts as will be fully described hereinafter and particularly pointed out in the claims.

The invention will be more readily understood by reference to the accompanying drawings forming a part of this application and in which:

Fig. 1 is a side elevation of an anchor embodying the present invention,

Fig. 2 is an end elevation of the same,

Fig. 3 is a top plan view,

Fig. 4 is a detail cross section of the fluke on the line 4—4 of Fig. 1,

Fig. 5 is a similar section in the line 5—5 of Fig. 1,

Figs. 6 to 16 inclusive are transverse sections taken on the lines 6 to 16 inclusive of Fig. 1, at right angles to a plane through x—x and y—y, Fig. 17 is a plan view of the forward end of the fluke and keel, illustrating a modified form thereof, Fig. 18 is a side elevation of the same, Fig. 19 is a detail sectional view of a modified connection between the shank and the fluke, keel and rudder assembly, Fig. 20 is a detail cross-section on the line 20—20 of Fig. 19, Fig. 21 is a diagram illustrating the manner in which the anchor normally rolls on the bottom, Fig. 22 is a diagrammatic view illustrating the lateral sluing of the anchor, Fig. 23 is a diagram illustrating the operation of the camming surface of the rudder, Fig. 24 is a diagram illustrating several successive positions of the fluke as it penetrates a bottom having a soft upper stratum, the view being taken along the axis of rotation, and Fig. 25 is similar view at substantially right angles thereto.

Referring to the drawings, 20 indicates the shank of the anchor terminating at the forward end 21 thereof in a ring 22 which constitutes means for attaching a cable thereto. Extending forwardly from approximately the rear end 23 of the shank 20, and at an acute angle to said shank, is a fluke 24, which tapers from a broad rear end 25 to a pointed forward end 26.

It is to be understood that the terms "forward" and "rear," with their derivatives as used herein, have reference to the general direction of movement of the anchor when being moved into operation due to the pull thereon by the cable attached to the ring 22, or other attaching means. Also, the term "bottom," unless specifically qualified, refers to the ground beneath a body of water.

The fluke 24 may be provided on the rear or outer face 24', thereof with a strengthening rib hereinafter termed the keel 27. Said keel is preferably formed integrally with the fluke and shank, and extends centrally of the fluke from the rear end 23 to the forward pointed end 26 thereof.

In the form illustrated in Figs. 1 to 16 inclusive, the keel tapers in width, and preferably in depth also, from the rear end 28 thereof to the forward end 29, as illustrated in Figs. 3 and 1 respectively, terminating in a bill 29' which projects beyond the pointed end 26 of the fluke and in alignment with the axis x—x thereof. The bill 29' is sharpened as indicated at 29ª to facilitate a quick bite of the same into bottom. The taper of the keel is also indicated by Figs. 4 and 5 of the drawings.

If preferred, the fluke and keel may terminate at the same point 26', as illustrated in Figs. 17 and 18. In this form of the invention the keel is symmetrically beveled at the forward end thereof, as indicated at 27', to merge with the side edges 24'' of the fluke, by which construction the ends of said fluke and said keel together form the bill 29'.

In order to ensure that the bill 29' shall quickly "dig in" when brought into contact with the bottom, it is essential, when pull on the anchor is exerted by the cable, that the fluke shall be moved in substantially the direction of the axis x—x of the fluke, and not in the direction of the pull on the shank. Should the fluke be moved directly forwardly in the direction of the pull, the fluke will usually scrape along the bottom indefinitely instead of quickly penetrating the bottom. Frequently when the bill engages an obstruction, the anchor will swing sidewise with the bill as a pivot, thereby bringing the face or palm of the fluke 24ª to a position more directly transverse to the line of force of the pull, until the bill becomes disengaged from the obstruction, after which the scraping of the fluke along the bottom is resumed.

To avoid such conditions, and to ensure that the fluke shall move in substantial alignment with the axis x—x, as above stated, a rudder 30 is provided at the rear end 23 of the shank. Said rudder is preferably an integral extension of the fluke 24 and extends rearwardly from the broad end 25 thereof at an obtuse angle to the plane of the palm or forward face 24ª of said fluke, as illustrated in Fig. 1 of the drawings; and it will be noted that the rudder 30 extends to and beyond the axis y—y of the shank 20, as illustrated in Fig. 1 and as will be more fully described hereinafter. The engagement of the rudder with the bottom will slue the rear end of the anchor laterally in the direction of the fluke and will maintain the movement of the fluke in substantial alignment with the axis x—x of the keel and fluke, thereby overcoming entirely, or reducing to minimum, any tendency of the anchor to pivot on the bill, or for the fluke to scrape along the bottom as above described. It will be noted with reference to Figs. 1, 2 and 3 that the axes x—x and y—y lie in and embrace a common plane.

The keel 27, in addition to strengthening the fluke, is made of sufficient weight to locate the center of gravity of the anchor materially toward the fluke at a point between the axis z—z of rotation and the axis x—x of the fluke, as indicated at G in Fig. 1. This tends to gravitate the bill into contact with the bottom and to maintain such contact, as will more fully appear hereinafter. In the form illustrated in Figs. 17 and 18 of the drawings, the transverse dimensions of the keel 27 are greater than in the above described form, whereby the weight thereof is correspondingly heavier than the shank, thereby locating the center of gravity of the anchor further from the axis of the shank and nearer to the bill. By variation in the weight of the keel, the center of gravity may be located as desired by the designer of the anchor for specific uses or conditions, without departing from the present invention.

The rudder 30 not only serves to slue the rear end of the anchor as above described, but also constitutes means to ensure rolling of the anchor on the bottom to bring the bill into operative engagement with the bottom, and also means for raising or upwardly camming the rear end of the shank and fluke, together with the rudder, when the upper stratum of the bottom is soft or sticky, so as to permit the proper rolling movement of the anchor under such adverse conditions. To this end, the forward face 31 of the rudder is convexly cylindrical, with the generatrix thereof at an obtuse angle to the axis $x$—$x$ and palm of the fluke as hereinbefore stated, and the periphery 32 of the rudder is arcuate. The entire rudder, including the periphery, is symmetrical with relation to the plane of the axes $x$—$x$ and $y$—$y$ of the fluke and shank respectively, as illustrated in Fig. 2 of the drawings. The face 31 of the rudder being curved transversely of the generatrix of the surface, the curved lower portion, whichever side is down, constitutes an inclined cam surface 32' which rides up on the soft bottom stratum thereby elevating the rudder, the rear end of the shank and the inner end of the fluke, so that the anchor may roll to incline the bill downwardly.

The center of curvature of said periphery 32 constitutes the axis of rotation of the anchor as it rolls on the bottom to bring the bill into engagement therewith. When the anchor is lowered to the bottom the cable end of the shank, and the periphery 32 of the rudder engage the bottom; and the anchor is in an unstable position until the bill is brought into engagement with the bottom due to the eccentricity of the center of gravity G with relation to said axis. The axis of rotation $z$—$z$ lies in the plane of the axes $x$—$x$ and $y$—$y$, and extends from the cable end of the shank to the rudder-fluke assembly, passing between the axis $y$—$y$ of the shank and said center of gravity, as indicated in Fig. 1; so that center of gravity is eccentric to said axis of rotation in the direction of the fluke.

As hereinbefore stated, the forward face of the rudder is preferably an integral extension of the fluke, and when of said construction, the broad end 25 of the fluke merges into the cylindrical face 31 of the rudder by curved surfaces 33. It should also be noted that the end portions 32' of the arcuate peripheries extend laterally beyond the side edges 24'' of the fluke so that when the anchor rests on the bottom supported by the cable end of the shank, an end portion 32' of the periphery of the rudder, and the bill 29, the lowermost side edge 24'' of the fluke will be elevated above the plane of said parts and is therefore spaced from the bottom when said bottom is hard.

In the form of the anchor illustrated in Figs. 1 to 16 inclusive, as hereinbefore described, the shank, keel, fluke and rudder are formed in one piece. However, if preferred, the shank 20 may be formed separately from the fluke-keel and rudder assembly and welded thereto as illustrated in Figs. 19 and 20. In this modification of the anchor, the rear end 23 of the shank is formed with an angular extension 20' which is welded into a socket 30' in the rear end of the keel 27.

The operation of the anchor will be more readily understood by reference to the diagrammatic Figs. 21 to 25 inclusive of the drawings.

In Fig. 21, the anchor is indicated by full lines in an approximate position it will assume upon reaching the bottom; and $Z^1$ indicates the position of the axis of rotation, and G' the center of gravity. The center of gravity being eccentric to the axis of rotation $z$—$z$, the anchor will rotate on the axis with the periphery 32 rolling on the bottom, until the bill 29' engages the bottom, as indicated in dotted lines, with the axis of rotation moving to $Z^2$ and the center of gravity to $G^2$. The anchor is now in position for the fluke to penetrate the bottom as soon as pull is exerted by the cable.

As hereinbefore stated, the fluke should be moved in substantial alignment with the axis $x$—$x$ thereof, and this is accomplished by the rudder 30, as indicated graphically in Fig. 22.

The pull of the cable is initially in the direction of the line $a$, and as the bill 29' is in engagement with the bottom the tendency of the fluke is to swing, with the bill as a pivot, and bring the fluke into a position more transverse to the direction of the pull, as hereinbefore described. However, as the rudder extends rearwardly from the fluke at an obtuse angle thereto, said rudder slues the fluke, together with the rear end of the shank substantially in the direction of the axis of the fluke as indicated in dotted lines in Fig. 22.

In Fig. 23 the engagement of the lower edge of the rudder 30 with the bottom is illustrated, the line $m$ indicating the curve of the face 31 of the rudder on the line $m$—$m$ of Fig. 22; and $n$ the vertical section on the line of the pull on the cable. It will be noted that a tangent to the curve of the face 31 of the rudder is at substantially an angle of 45 degrees to the upper surface of the bottom. This will vary slightly as the cable end 21 of the shank 20 is raised or lowered; also as the fluke digs in.

When the upper stratum of the bottom is soft, as indicated in Figs. 23, 24 and 25, the anchor will sink therein commensurate to the degree of softness of said stratum, and the weight of the anchor. Under such conditions the anchor cannot roll on the bottom as above described. However the lower, submerged portion of the rudder face 31 constitutes a cam 32' to ride up on the soft bottom and thereby raise the rear end of the anchor out of said soft bottom sufficiently to permit the anchor to roll.

In each of Figs. 24 and 25 is illustrated successive positions of the fluke as it penetrates the bottom, but it is to be understood that the several successive positions illustrated are not the same position in the two figures. In Fig. 24 the fluke is viewed along the axis of rotation, substantially as in Fig. 2; and in Fig. 25 the fluke is viewed at substantially right angles to that of Fig. 24.

When cable pull is exerted on the anchor, and the fluke digs in, resistance to the pull increases progressively until the resistance equals the pull. The center of resistance to the pull is at the center of that area of the fluke which is submerged in the bottom, and such centers are indicated by the points P—P' in Fig. 24. It is evident that the center of resistance shifts on the face of the fluke as the fluke digs in. Said resistance is at right angles to the palm of the fluke as indicated by the lines R and R', Fig. 22. When the bottom is soft, the cam action of the rudder, as hereinbefore described, continues to elevate the rudder and the adjacent end of the shank, or to hold the same elevated until turning and penetration of the anchor brings the shank in contact with the bottom; after which a couple consisting of an upward reaction force of the bottom on the shank and a downward component of the reaction at the center of area of the imbedded part of the fluke turns the anchor as it penetrates until the forces of the couple come into alignment and equilibrium, with the plane of the axes $x$—$x$ and $y$—$y$ vertical. In Fig. 25, successive positions of the shank 20 are indicated by the lines $s$, $s'$, and $s''$, as the cable end of the shank may be raised from the bottom due to the pull of the cable.

It is believed that the construction and operation of the anchor will be clear from the foregoing description.

I claim:

1. An anchor comprising a shank, attaching means at the forward end of the shank, a fluke extending outwardly at an acute angle and forwardly from the rear end of the shank and tapering from a substantial width near the shank to a pointed forward extremity, and a rudder extending rearwardly from the rear end of the fluke, the fluke and rudder being substantially symmetrical with relation to a plane passing lengthwise through the shank and also through the center of the fluke, said rudder having a forward face the center of which embraces the plane and is at an obtuse angle with the forward face of the fluke, the lateral portions of the rudder on each side of the plane being slanted rearward in the direction of the plane.

2. An anchor comprising a shank, attaching means at the forward end of the shank, a fluke substantially rigid with the shank extending outwardly at an acute angle and forwardly from the rear end of the shank and tapering from a substantial width near the shank to a pointed forward extremity, and a rudder extending rearwardly from the rear end of the fluke, said rudder having a convex forward face the generatrix thereof being at an obtuse angle to the forward face of the fluke, said fluke and rudder being substantially symmetrical with relation to a plane passing lengthwise through the shank and also through the center of the fluke, the rearward end of the fluke being joined to the forward end of the rudder.

3. An anchor comprising a shank, attaching means at the forward end of the shank, a fluke extending outwardly at an acute angle and forwardly from the rear end of the shank and tapering from a substantial width at its rear end to a pointed forward end, a keel extending along and attached to the rearward center face of the fluke and attached to the end of the shank, and a rudder extending rearwardly from the rear end of the fluke, the fluke and the rudder being substantially symmetrical with relation to a plane passing lengthwise through the shank and also through the fluke, the lateral portions of the rudder on both sides of the plane being slanted rearwardly towards the plane.

4. An anchor comprising a shank, attaching means at the forward end of the shank, a fluke extending outwardly at an acute angle and forwardly from the rear end of the shank and tapering from a substantial width near the shank to a pointed forward extremity, and a rudder attached to the rear end of the fluke and disposed at an obtuse angle with respect to the fluke, the fluke and the rudder being substantially symmetrical with relation to a plane passing lengthwise through the shank and also through the center of the fluke, the lateral portions of the rudder on each side of the plane being slanted rearward towards the plane, said rudder terminating in an arcuate periphery, said anchor having an axis of rotation embracing the center of curvature of the arcuate periphery and the forward end of the shank, the center of gravity of the anchor being eccentric to the axis of rotation and in the direction of the fluke.

5. An anchor comprising a shank, attaching means at the forward end of the shank, a fluke integral with the shank extending outwardly at an acute angle and forwardly from the rear end of the shank and tapering from a substantial width near the shank to a pointed forward extremity, and a rudder integral with said fluke and extending rearwardly therefrom, said rudder having a forward face at an obtuse angle to the forward face of the fluke, the fluke and the rudder being substantially symmetrical with relation to a plane passing lengthwise through the shank and also through the center of the fluke, the lateral portions of the rudder on each side of the plane being curved backward towards the plane, the rudder terminating in an arcuate periphery which serves to roll the anchor to a position with the fluke in contact with the bottom, the center of gravity of the anchor lying between the fluke and the shank.

6. An anchor comprising a shank, attaching means at the forward end of the shank, a fluke integral with the shank extending outwardly at an acute angle and forwardly from the rear end of the shank and tapering from a substantial width near the shank to a pointed forward extremity, a keel integral with the shank attached to the rear of the fluke, a rudder integral with the fluke and extending rearwardly therefrom, the fluke and the rudder being substantially symmetrical with relation to a plane passing lengthwise through the shank and the fluke, the rudder having a forwardly convex face, and being at an obtuse angle with the forward face of the fluke, said rudder terminating in an arcuate periphery which serves to roll the anchor to a position with the pointed extremity of the fluke in contact with the bottom.

7. An anchor in the form of a unitary structure comprising a shank with attaching means on the forward end thereof, a keel, a fluke and a rudder, the centers of the shank, keel, fluke and rudder embracing a common plane and being symmetrical with reference thereto, the fluke and keel extending forwardly at an acute angle with the shank, the fluke being of maximum width where it joins the rudder and tapered forwardly to a pointed bill, the rudder having a convex forward face the center of which is inclined forwardly at an obtuse angle with reference to the forward face of the fluke and having an arcuate perimeter, lateral edge portions of the rudder being curved rearwardly towards the plane and extending beyond the widest portion of the fluke at the area of connection therewith and forming cam surfaces which engage the bottom to orient the rudder and direct the bill downward.

References Cited in the file of this patent

UNITED STATES PATENTS

| Number | Name | Date |
|---|---|---|
| 1,081,163 | Smith | Dec. 9, 1913 |
| 1,974,933 | Taylor | Sept. 25, 1934 |
| 2,103,477 | Lucking | Dec. 28, 1937 |
| 2,320,966 | Danforth | June 1, 1943 |

FOREIGN PATENTS

| Number | Country | Date |
|---|---|---|
| 1,129 | Great Britain | 1864 |
| 652,450 | Great Britain | Apr. 25, 1951 |